Aug. 23, 1938.　　　R. L. BAILEY　　　2,127,968
ROTARY STEAM ENGINE
Filed Sept. 3, 1935　　　3 Sheets-Sheet 1

INVENTOR.
ROBERT L. BAILEY
BY Rosy J. Garofalo
ATTORNEY

Aug. 23, 1938.  R. L. BAILEY  2,127,968
ROTARY STEAM ENGINE
Filed Sept. 3, 1935  3 Sheets-Sheet 2

INVENTOR.
ROBERT L. BAILEY
BY Ross J. Garofalo
ATTORNEY

Aug. 23, 1938.                R. L. BAILEY                 2,127,968
                           ROTARY STEAM ENGINE
                         Filed Sept. 3, 1935       3 Sheets-Sheet 3
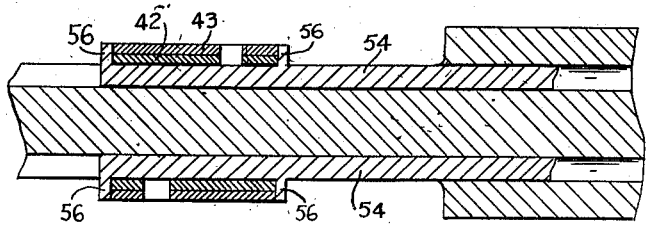
FIG. 4
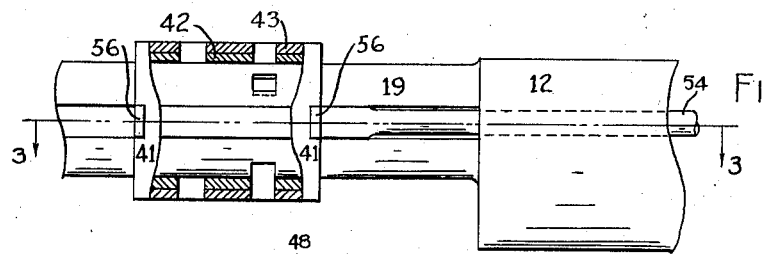
FIG. 5
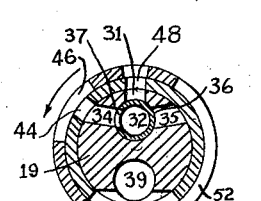 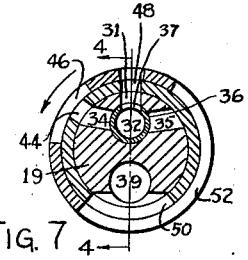 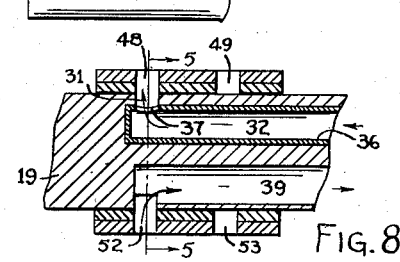
FIG. 6         FIG. 7              FIG. 8
 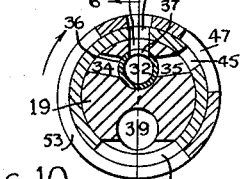 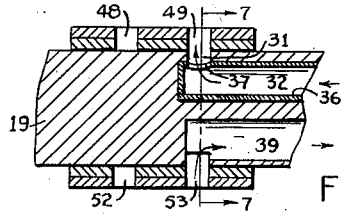
FIG. 9         FIG. 10             FIG. 11
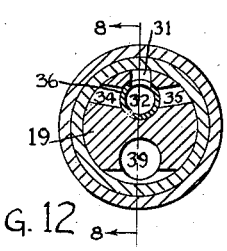 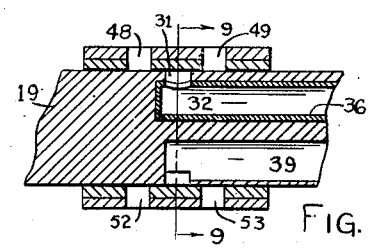
FIG. 12              FIG. 13
INVENTOR.
ROBERT L. BAILEY
BY Ross J. Garofalo
ATTORNEY Patented Aug. 23, 1938

2,127,968

UNITED STATES PATENT OFFICE 2,127,968

ROTARY STEAM ENGINE

Robert L. Bailey, Glendale, Calif.

Application September 3, 1935, Serial No. 38,895

7 Claims. (Cl. 121—57)

This invention relates to engines propelled by steam or other gaseous fluids and in particular, the invention relates to steam engines of the rotary type.

It is an object of my invention to provide a rotary steam engine which shall be as nearly as possible perfectly balanced, capable of being operated at a very high speed and free from excessive friction.

A further object of my invention resides in the provision of a rotary steam engine which is capable of operating efficiently with a minimum amount of vibration and noise.

A further object of my invention resides in a device which is small in comparison with the work it can perform, which is light in weight and which may be produced at a very low cost.

Briefly stated, the rotary engine forming the subject of my invention comprises an external rotor and an internal rotor suitably mounted within the external rotor, on an axis which is non-concentric with the axis of the external rotor. The internal rotor is operatively connected to the external rotor so as to revolve synchronously therewith and in the same direction. A plurality of vanes are movably mounted in one of the rotors and are movably engaged with the other rotor so as to divide the space between the two rotors into a plurality of non-communicating chambers. A plurality of ports are also provided in the internal rotor which communicate with the spaces or chambers divided by the vanes. An intake line is provided for the introduction of steam or other gaseous fluid and an exhaust line is provided for the exhausting of the used fluid. Valved means are provided for controlling the introduction of the steam or other gaseous fluid into the chambers.

Stated more specifically, the rotary engine forming the subject of my invention may be described as comprising an outside ring substantially in the shape of a hollow cylinder with a pair of cover plates mounted on each side of the outside ring, said outside ring and cover plates comprising an external rotor. The inner circumference of the outside ring is provided with a plurality of equally spaced plane surfaces or flats. The central portion of each cover plate is recessed to receive a bearing for the non-eccentric shaft about which the external rotor may be revolved. On the interior surfaces of each cover plate, a projecting ring is provided which is positioned in a circle which is concentric with the recesses in the cover plates. Plane surfaces or flats are provided on each projecting ring which are parallel to and equidistant with the plane surfaces provided on the outside ring. A plurality of equally spaced pins are mounted between the cover plates on a circle concentric with the center of the cover plates. An internal rotor provided with bearings for the eccentric of the aforementioned eccentric shaft is mounted on the eccentric and within the external rotor. The internal rotor is thus mounted in an eccentric position with respect to the external rotor. The internal rotor is provided with a plurality of equally spaced recesses on a circle concentric with the center bore of the internal rotor. The circumferences of the recesses are adapted to engage with the circumferences of the pins so that when the external rotor is rotated, the internal rotor is compelled to rotate synchronously therewith and in the same direction. The internal rotor is also provided with a plurality of equally spaced and radially disposed slots to receive vanes, the outer ends of which are adapted to engage with the plane surfaces of the outer ring, while the inner ends are adapted to engage the projecting rings. The plane surfaces are for the purpose of allowing the vanes to slide back and forth as the rotors are rotated. The vanes divide the space between the two rotors into a plurality of non-communicating chambers. The number of such chambers will be determined by the number of vanes. Located along the side of each slot and on the center of the internal rotor, a port is provided which extends from the periphery of the internal rotor to the central bore of the internal rotor. The ports thus communicate with the chambers at one extremity and with the eccentric at the other extremity. These ports serve as both intake and exhaust ports depending upon the position of the internal rotor with respect to the eccentric and the slide valve unit to be described. About the eccentric portion of the eccentric shaft and adapted to slide thereon, a valve unit is provided for the purpose of controlling the passage of steam or other gaseous fluid into the ports. The slide valve unit is provided with a plurality of ports which are adapted to control the direction of rotation of the rotors. Communicating with the ports in the slide valve unit, intake and exhaust passageways are provided in the eccentric shaft which communicate with intake and exhaust lines for the purpose of admitting steam or other gaseous fluid into the non-communicating chambers and exhausting steam therefrom, respectively. A particular feature of the invention resides in the provision of a rotary sleeve valve in the intake passageway for admitting the steam or other gaseous fluid into a chamber which is in a partially enlarged position; this is for the purpose of starting the rotation of the rotors. The rotary sleeve valve is adapted to be turned to such a position that the port therein may be made to register with either of two intake passageways provided in the eccentric shaft which communicate with the main intake passageway and with corresponding registering ports in the slide valve unit so that the steam may be introduced into the chambers in the starting positions. The rotary sleeve valve may also be turned to register with another intake passageway and corresponding registering ports in the slide valve unit so that the steam may be introduced into the chambers in the desired running position.

Other objects, features and advantages of my invention will become apparent to those skilled in the art from the following description of my invention taken from the drawings which is not to be considered as limiting my invention.

Fig. 4 is a sectional elevation taken along line 3—3 of Fig. 5 illustrating the slide valve unit and parts connecting therewith to operate the same.

Fig. 5 is an elevation of the slide valve unit and connecting parts parts being shown in section and parts being shown broken away.

Fig. 6 is a section illustrating the position of the slide valve unit and rotary sleeve valve in starting position for counterclockwise rotation of the device.

Fig. 7 is a cross-section taken along line 5—5 of Fig. 8 and illustrates the position of the slide valve unit and rotary sleeve valve in running position for counterclockwise rotation of the device.

Fig. 8 is a cross-section taken along line 4—4 of Fig. 7.

Fig. 9 is a section showing the position of the slide valve unit and rotary sleeve valve in starting position for clockwise rotation of the device.

Fig. 10 is a cross-section taken along line 7—7 of Fig. 11 and illustrates the position of the slide valve unit and rotary sleeve valve in running postion for clockwise rotation of the device.

Fig. 11 is a cross-section taken along line 6—6 of Fig. 10.

Fig. 12 is a cross-section taken along line 9—9 of Fig. 13 and illustrates the position of the slide valve unit in neutral position.

Fig. 13 is a cross-section taken along line 8—8 of Fig. 12.

Figure 1:
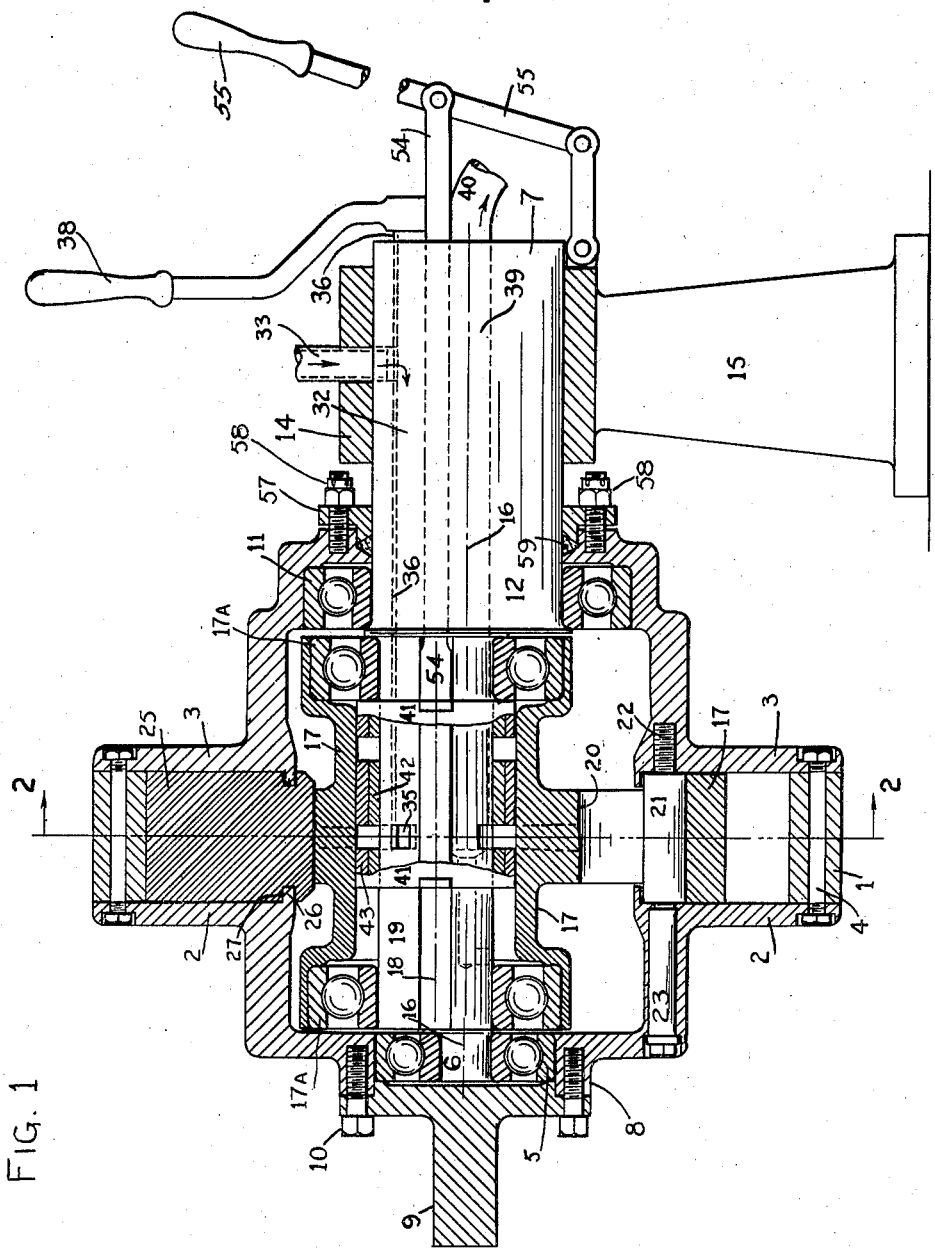
Fig. 1 is a cross-sectional elevation of the device taken along line 1—1 of Fig. 2 parts being shown broken away.

Referring more particularly to the drawings wherein like reference numerals refer to corresponding parts throughout the several views, 1 denotes an outside ring which is substantially in the shape of a hollow cylinder and is fastened to circular left and right cover plates 2 and 3, respectively, by means of a plurality of bolts 4. The outside ring 1 and the cover plates 2 and 3 form an assembly which shall be referred to hereinafter as the external rotor.

At the center of the left cover plate 2, a recess is provided to receive a bearing 5 for left portion 6 of the eccentric shaft 7. A hub 8 is also provided to which is fastened stub shaft 9 by bolts 10. The stub shaft may be connected to a pulley or gear which may in turn be connected to the device to which it is desired to transmit the power. The right cover plate is substantially similar in construction as the left cover plate with the exception that a larger bearing 11 is provided for right portion 12 of eccentric shaft 7, which is of greater diameter than shaft 6. The remaining portion of the shaft 12 extends through the cover plate and is supported by a suitable bearing 14 which is suitably mounted on frame 15. Thus, the external rotor is so provided as to revolve about fixed axis 16 on bearings 5 and 11. It will be observed that during rotation of the external rotor and the internal rotor to be described, the eccentric shaft remains stationary while the rotors revolve about the shaft. If desired, the portion of the eccentric shaft passing through the bearing 14 may be provided with a keyway and key or a set screw to prevent the shaft from revolving when the rotors are rotated.

An internal rotor 17 provided with bearings 17a is mounted in the interior of the external rotor so as to revolve about fixed axis 18 on eccentric 19 of the eccentric shaft 7. Shafts 6, 12 and 19 form the eccentric shaft 7. Shafts 6 and 12 have a common fixed axis 16, while the fixed axis 18 is eccentrically positioned with reference to the axis 16 of the external rotor. By the arrangement shown in the drawings, the internal rotor revolves inside of the external rotor but nearer to one side than to the other due to the eccentric positioning of eccentric 19 with respect to shafts 6 and 12. Preferably, the internal rotor is so positioned eccentrically in the external rotor that one end substantially contacts the inner surface of the external rotor to provide an oil seal. This will cause substantially all of the used steam or other gas to be forced out of the chamber after its propelling force has been spent.

The internal and external rotors revolve synchronously. This effect may be produced in various ways without departing from the spirit of my invention. In the method illustrated in the drawings, a plurality of equally spaced circular recesses 20 are provided in the internal rotor about a circle concentric with the axis 18 and an equal number of pins 21 extending through the recesses are mounted between the left and right cover plates about a circle concentric with axis 16. The right end 22 of the pins is threaded in the right cover plate 3, while the left end which is similarly threaded is fixed to the left cover plate by means of a screw 23. The pins are provided in such position as to engage the internal circumferences of the recesses 20. Thus, by this means, when the external rotor is revolved on shafts 6 and 12 or in other words, about fixed axis 16, by the steam introduced into the chambers, the internal rotor 17 is also compelled to revolve in the same direction due to engagement with pins 21. However, the rotor 17 revolves freely about eccentric 19 or in other words about its own fixed axis 18. The recesses 20 may be of any diameter but in order to obtain the synchronized rotation of the internal and external rotors, the radius of the recesses 20 is made equal to the sum of the distances between axes 16 and 18 of the two rotors and the radius of the pins 21.

A plurality of equally spaced and radially disposed slots 24 are provided in the internal rotor to receive vanes 25 which are substantially rectangular in shape and of a thickness substantially equal to the width of the slots. This is for the purpose of dividing the space between the two rotors into as many non-communicating chambers as there are vanes as will be more fully explained hereinafter.

Projecting rings 26 are provided on the inner surfaces of both cover plates and are formed around the center thereof. These rings are provided with as many plane surfaces or flats 27 as there are numbers of vanes. The edges of the plane surfaces of the projecting ring on one cover plate are parallel to those on the other cover plate. Correlated plane surfaces 28 are formed on the inner surfaces of the outside ring 1. The vanes 25 are positioned in the slots 24 and are provided at their inner ends with slots 26 so as to engage the projecting rings 26. The outer ends of the vanes are adapted to slide along the plane surfaces 28 of the outside ring 1. Thus, with the vanes positioned as described, when the external rotor is revolved, which also causes the internal rotor to revolve in the same direction, the inner end of vanes 25 slides along plane surfaces 27 of the projecting rings and plane surfaces 28 of the external rotor, while the upper and lower sides of the vanes slide along the outer portions of the inside surfaces of the cover plates. The vanes also slide backward and forward in the slots as will be more fully described. While preferably I provide two projecting rings in the device, it is to be understood that I may dispense with one of said projecting rings and thus provide only one with the desired number of plane surfaces for carrying the vanes. This will be understood by those skilled in the art.

To one side of each slot 24, ports 30 are drilled substantially radially through the center of the internal rotor which extend into the central bore of the internal rotor. These ports function as both intake and exhaust ports for the steam or other gaseous fluid employed as the operating force for the rotation of the rotors as will be described hereinafter more fully. Thus, the ports communicate at their outer ends with the space between the internal and external rotors. The eccentric 19 of the eccentric shaft 7 is provided with a vertical passageway 31 which communicates with a longitudinally disposed passageway 32 drilled through the center of the eccentric shaft which, in turn, is connected with an inlet pipe 33. The eccentric 19 is also provided with passageways 34 and 35 which also communicate with the longitudinally disposed passageway 32.

A sleeve 36 extends throughout the entire length of passageway 32. The sleeve is provided with a port 37 and is adapted to be rotated in the passageway by lever 38 so that the port 37 may be made to register with either one of the passageways 31, 34 or 35. Thus, sleeve 36 operates as a rotary valve. Adjacent and parallel to passageway 32, a similar passageway 39 is provided which connects with an exhaust pipe 40. Passageway 39 and exhaust pipe 40 serve to exhaust the used steam or other gas from the chambers.

In the inner bore of the internal rotor 17 and positioned about eccentric 19 and adapted to slide thereon, a slide valve unit 41 is provided which is made up of an inner sleeve 42 and an outer sleeve 43. The sleeve 42 fits very closely in the outer sleeve 43 so as to prevent it from sliding or otherwise moving in the sleeve 43. If desired, the two sleeves may be made integrally. Sleeve 42 is provided with ports 44 and 45 which are in line, respectively, with ports 46 and 47 of the outer sleeve. Ports 44 and 46 and ports 45 and 47 serve to admit the steam into the chambers for the purpose of starting the rotation of the rotors. Ports 48 and 49 are provided in the sleeves which are adapted to communicate with passageway 31 for the purpose of operating the device in running position as will be described hereinafter more fully. The inner sleeve 42 is also provided with exhaust ports 50 and 51 which communicate with ports 52 and 53, respectively, of the outer sleeve. Ports 52 and 53 are larger than ports 50 and 51 respectively. This is for the purpose of exhausting steam from a plurality of chambers simultaneously and thus providing a more complete exhausting of the used steam from the chambers.

The slide valve unit 41 is caused to slide on eccentric 19 by means of rods 54 which extend through longitudinal passageways provided in the shaft 7 and are connected to a lever arrangement 55. The rods 54 are provided with lugs 56 which carry the sleeves 42 and 43. Thus, when the lever 55 is pulled outwardly as shown in Fig. 1, the steam to rotate the rotors is admitted through port 48 and passageway 31 into the chamber via ports 30 in the internal rotor. This will cause the rotors to rotate in a counterclockwise direction. In this position, the steam is exhausted through ports 50 and 52. When the lever 55 is pushed towards the device, the slide valve unit is caused to slide along the eccentric 19 and when port 49 registers with passageway 31, the steam will be admitted through this port into the chambers via ports 30 and the rotors will be rotated in a clockwise direction. In this position, the steam is exhausted through ports 51 and 53.

While I have described the essential features of the device forming the subject matter of my invention, there will be apparent to those skilled in the art, many improvements which will result in a smooth and efficient operation of the device. While I have not shown means for lubricating the device, provision may be made for lubricating the various working parts such as the bearings, vanes and pins. Provision may also be made to prevent leakage of the steam or other motivating gas employed. For example, sealing rings may be provided between the surface of the eccentric and the inner sleeve 42 by providing grooves in the inner surface of the inner sleeve to receive the rings. I have shown means to prevent leakage of the steam from the right cover plate 3. This consists in a packing ring 57 which is fastened to the end of the cover plate by means of screws 58. The space 59 between the cover plate and the packing ring may be filled with any desired packing material.

While I have shown the space between the internal and external rotors as being divided into six chambers, it is obvious that this space may be divided into a greater or lesser number by providing the necessary number of vanes, etc. I have described a device with six chambers but there is no reason why the device cannot be made to operate satisfactorily with a different number of chambers.

Figure 2:
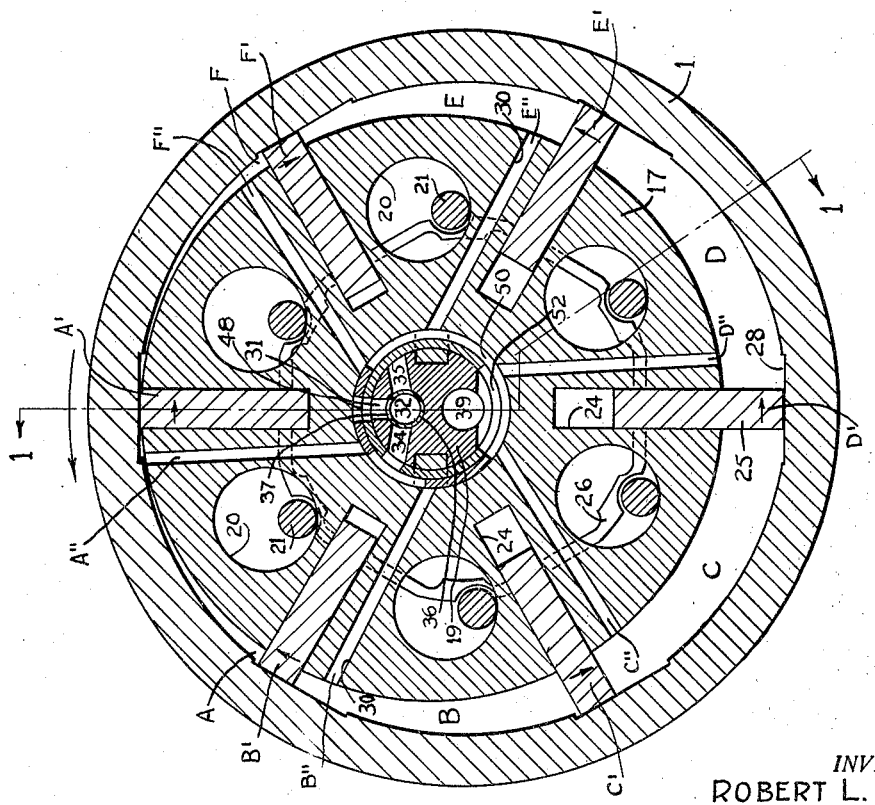
Fig. 2 is a section of the device taken along line 2—2 of Fig. 1.

For convenience in describing the operation of the device, I have indicated the various chambers shown in Fig. 2 as A, B, C, D, E, and F, the vanes as A', B', C', D', E' and F', and the ports in the internal rotor as A'', B'', C'', D'', E'' and F''. Referring more particularly to Fig. 2 of the drawings, the chamber A is in a position where the steam has been admitted into the chamber and the chamber has rotated only a few degrees, the steam having been introduced into the chamber via line 33, passageways 32 and 31 and port A''. The expansion of the steam in the chamber causes the rotors to rotate in the counterclockwise direction indicated by the arrow. The expansion of steam in the chamber continues until the expansive force is dissipated by the gradual increase in the volume of the chamber, after which the port A'' is opened to the exhaust ports 50 and 52 as shown by port C''. The chamber is then ready to start the exhaust cycle. The exhausting continues until the chamber reaches the position as shown by port F''' after which it is sealed off from the exhaust passageway and the chamber is then ready to take another charge of steam. During the rotation of the rotors, the chambers each assume the various positions A, B, C, D, E and F. Each of said positions represents 60° of rotation, this figure being arrived at by dividing the number of chambers into 360°. Thus, at position C, the chamber is starting to exhaust. At the 180° point, it is still in communication with the exhaust port and continues to do so until approximately at position F. Thus, as shown in Fig. 2, chambers C, D and E are exhausting steam from the chambers while chamber F has just about completed the exhausting cycle. The exhausting of steam from the chambers D and E is aided by the narrowing of the chambers in volume due to the eccentric positioning of the rotors. Chamber C is also shown as commencing the exhausting cycle. However, this occurs prior to its reaching its maximum volume. It is desirable to start the exhaust cycle from the chamber prior to its reaching its maximum volume in order to prevent any back pressure in the chambers and thus retarding the rotation of the rotors. When the port 30 of any chamber registers with ports 31 and 48, the latter two ports being continuously in registering position when the device is in running position, the chamber is ready to receive a fresh charge of steam and thus start a new cycle. The introduction of the steam into the chambers is preferably ahead of top dead center and continues beyond the top dead center. The interval of steam introduction into the chambers is very short. For example, I may start the introduction of the steam about 20° before the chamber reaches top dead center and continue the introduction approximately 20° past top dead center. The expansion of the steam then continues for approximately 115° after the intake port closes.

As indicated above, the rotation of the rotors causes the vanes to slide along the plane surfaces 27 and 28 and in the slots 24. As the rotors are revolved, the vanes 25 are at all times substantially radial to the inner rotor. The vanes are furthest in the slots when the chambers are substantially at top dead center, that is, at the 0° position. At this position, the vanes are also centrally disposed in the plane surfaces. The uppermost vane in Fig. 2 is shown at substantially top dead center. As the rotors revolve in the direction indicated by the arrow from the aforesaid position, the vanes slide in a clockwise direction towards one end of the plane surfaces. Due to the eccentricity of the internal rotor with respect to the external rotor, the vane will have risen in the slot with reference to the external rotor thus enlarging the volume of space A. When the device has rotated 90° from the start, the vane will have traveled to the furthermost clockwise position. Continued rotation of the rotors causes the vane to slide along the plane surfaces in a counterclockwise direction or in the same direction as that of the rotors. When 180° is reached, the position of the vane in the plane surfaces is precisely the same as it was at the 0° position. At this point, the vane will have risen to its outermost position in the slot. As the revolution continues, when 270° is reached, the vane has traveled along its plane surfaces to the farthest point in the opposite direction and is ready to return. Further rotation causes the vane to travel in a clockwise direction to the center of the plane surfaces when the rotors have been revolved 360°.

Figure 3:
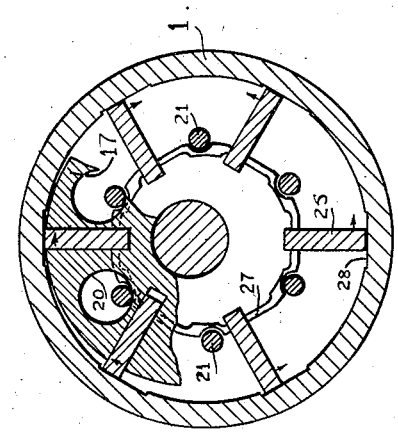
Fig. 3 is a section similar to Fig. 2 but on a smaller scale of the device with parts broken away so as to show details of the device.

In Fig. 2 of the drawings, I have indicated by arrows on the vanes the direction of travel of the vanes at their various positions. Thus, vanes A' and B' are shown as moving in a clockwise direction and will continue to do so until the 90° point is reached, after which its direction is reversed as shown by vanes C', D' and E'. At 180° the vane will have been centrally located in the plane surface 28 as shown by vane D'. At 270° the vane will have moved to the extreme opposite position after which further rotation resumes the clockwise direction of travel of the vane until the revolution has been completed. Vane F'' indicates the direction of travel after the vane has passed the 270° point. Fig. 3 also shows the direction that the vanes slide in their respective plane surfaces as the rotors are revolved.

It does not seem necessary to describe the action of the recesses 20 and pins 21 at any considerable length. It is evident that as the rotors revolve, the effect of the distance between the radii of the two rotors is continually keeping the pins 21 pressed against the internal surfaces of the recesses 20 as shown in the drawings. The rotors will, therefore, be held continually in the same relation to each other while each chamber will move about the axis of the external rotor.

Sliding of the valve unit 41 on the eccentric by means of lever 55 and rods 54 to a position so that the port 31 is centrally located or is between ports 48 and 49, the steam will be shut off, thus preventing rotation of the rotors. The valve unit will then be in a neutral position as shown in Figs. 12 and 13. If it is desired to cause the rotors to rotate in a counterclockwise direction, valve unit 41 is moved to its extreme right hand position by means of lever 55 so that port 48 registers with port 31 as shown in Fig. 8. Lever 38 is then revolved in a counterclockwise direction which causes the sleeve 36 to revolve until port 37 in the sleeve registers with passageway 34 as shown in Fig. 6. Steam will then be introduced into the chamber having its port 30 registering with port 46. The purpose of starting the rotation of the rotors in this position is to facilitate starting. By introducing steam into a chamber which is in a partially enlarged position, a greater impulse will be given to the rotors. If the steam is introduced into a chamber which is in substantially a position having its smallest volume, such as at top dead center, the steam may not give the rotors the starting impulse.

Once the device has been started, lever 38 is moved to a vertical position or to a position where port 37 in the sleeve 36 registers with port 31 as shown in Fig. 7. This will seal off passageway 34. The steam will then be introduced into the chambers via ports 30 when the chambers almost reach the 0° position. This will constitute the running position of the valve unit and the sleeve valve for counterclockwise rotation. The reason for providing port 46 larger than port 48 is to give the device a larger amount of steam so as to provide the necessary starting torque. Once the device is under rotation, the amount of steam necessary to keep it running need not be as great. Hence, port 48 is reduced in size.

If it is desired to revolve the device in a clockwise direction from the neutral position, the valve unit 41 is moved to the extreme left hand position by means of lever 55 and its associated rods 54 so as to register port 49 with port 31 as shown in Fig. 11. Lever 38 is then revolved in a clockwise direction until the port 37 in the sleeve registers with the passageway 35 as shown in Fig. 9. This will admit steam into the chamber having its port 30 registering with port 47 and thus give the device its starting impulse. Once the device is started, the lever 38 is returned to a vertical position so as to register port 37 in the sleeve with passageway 31 and port 49 as shown in Fig. 10. This constitutes the clockwise running position of the device.

In actual operation, the speed of rotation of the rotors is controlled by the amount of steam introduced into the chambers. The amount of steam thus introduced may be controlled by a valve (not shown) on line 33 which is connected to a source of steam.

It is to be understood that the above description is merely illustrative of a preferred embodiment of my invention of which many variations thereof may be made within the scope of the following claims by those skilled in the art without departing from the spirit thereof.

Having now described my invention, what I claim as new and desire to secure by Letters Patent is:

1. In a gaseous fluid engine, an external rotor provided with a plurality of plane surfaces and mounted on a shaft, projecting rings in said external rotor provided with plane surfaces parallel to said first mentioned plane surfaces, an internal rotor mounted within said external rotor on a shaft integral with said first mentioned shaft and non-concentric therewith, a plurality of slots in said internal rotor, vanes in said slots and resting between said first and second mentioned plane surfaces, said vanes being adapted to divide the space between said rotors into a plurality of non-communicating chambers, a plurality of recesses in said internal rotor, a plurality of pins fixed to said external rotor and engaging said recesses, said recesses and pins being adapted to revolve said internal rotor synchronously with said external rotor, ports in said internal rotor communicating with each of said chambers, an intake passageway in the shaft of said internal rotor adapted to communicate with said ports and an exhaust passageway in the shaft of said internal rotor also adapted to communicate with said ports, a second intake passageway in the shaft of said internal rotor adapted to register with said ports and communicating with said first mentioned intake passageway to permit introduction of gaseous fluid into said chambers and adapted to start rotation of said rotors in a counterclockwise direction, a third intake passageway adapted to register with said ports and communicating with said first mentioned intake passageway to permit introduction of gaseous fluid into said chambers and adapted to start rotation of said rotors in a clockwise direction, a slide valve mounted on said shaft of said internal rotor and adapted to slide thereon, ports in said slide valve adapted to register with said second mentioned intake passageway, other ports in said slide valve adapted to register with said third mentioned intake passageway, another port in said slide valve adapted to register with said first mentioned intake passageway and a plurality of exhaust ports in said slide valve adapted to register with the ports in said internal rotor.

2. An apparatus as in claim 1 wherein said exhaust ports in said slide valve are of sufficient size as to exhaust a plurality of chambers simultaneously.

3. In a gaseous fluid engine, an external rotor provided with a plurality of plane surfaces and mounted on a shaft, projecting rings in said external rotor provided with plane surfaces parallel to said first mentioned plane surfaces, an internal rotor mounted within said external rotor on a shaft integral with said first mentioned shaft and non-concentric therewith, a plurality of slots in said internal rotor, vanes in said slots and resting between said first and second mentioned plane surfaces, said vanes being adapted to divide the space between said rotors into a plurality of non-communicating chambers, a plurality of recesses in said internal rotor, a plurality of pins fixed to said external rotor and engaging said recesses, said recesses and pins being adapted to revolve said internal rotor synchronously with said external rotor, ports in said internal rotor communicating with each of said chambers, an intake passageway in the shaft of said internal rotor adapted to communicate with said ports and an exhaust passageway in the shaft of said internal rotor also adapted to communicate with said ports, a second intake passageway in the shaft of said internal rotor adapted to register with said ports and communicating with said first mentioned intake passageway to permit introduction of gaseous fluid into said chambers and adapted to start rotation of said rotors in a counterclockwise direction, a third intake passageway adapted to register with said ports and communicating with said first mentioned intake passageway to permit introduction of gaseous fluid into said chambers and adapted to start rotation of said rotors in a clockwise direction, a slide valve mounted on said shaft of said internal rotor and adapted to slide thereon, ports in said slide valve adapted to register with said second mentioned intake passageway, other ports in said slide valve adapted to register with said third mentioned intake passageway, another port in said slide valve adapted to register with said first mentioned intake passageway, a plurality of exhaust ports in said slide valve adapted to register with the ports in said internal rotor, a rotary valve provided with a port and adapted to register with said first, second and third mentioned intake passageways.

4. In a gaseous fluid engine, an external rotor comprising an outside ring and a pair of cover plates mounted on each side of said ring, the inner circumference of said ring being provided with a plurality of equally spaced plane surfaces, and the central portions of each cover plate being recessed, an eccentric shaft, the non-eccentric portions of said shaft being mounted within the recesses of said cover plates, projecting rings on the interior surfaces of said cover plates and concentric with said recesses of said cover plates, said projecting rings being provided with a plurality of plane surfaces parallel with the plane surfaces on said outside ring, a plurality of equally spaced pins mounted between said cover plates and on a circle concentric with said projecting rings, an internal rotor provided with a centrally disposed recess and mounted on the eccentric portion of said eccentric shaft and provided with a plurality of equally spaced recesses, the circumferences thereof being adapted to engage the circumferences of said pins, whereby rotation of said external rotor will cause said internal rotor to revolve synchronously therewith, a plurality of equally spaced slots in said internal rotor, vanes in said slots the ends of which engage the plane surfaces of said projecting rings and the plane surfaces of said outside ring, said vanes being adapted to slide along said plane surfaces when said rotors are rotated, said vanes dividing the space between said rotors into as many non-communicating chambers as there are vanes, radially extending ports in said internal rotor terminating at one extremity into said chambers and at the other extremity in the centrally disposed recess of said internal rotor, a passageway in said eccentric communicating with steam for propelling said rotors, a second passageway in said eccentric adapted to carry spent gaseous fluid from said chambers, a slide valve unit provided with ports adapted to slide on the eccentric portion of said eccentric shaft, the ports of said slide valve unit being adapted to register with the ports in said internal rotor and with the passageways in said eccentric shaft.

5. In a gaseous fluid engine, an external rotor, an internal rotor mounted within said external rotor on an axis non-concentric with that of said external rotor and operatively connected to said external rotor so as to revolve synchronously therewith and in the same direction, a plurality of vanes movably mounted in one of said rotors and movably engaged with the other so as to divide the space between said rotors into a plurality of non-communicating chambers, ports in said internal rotor communicating with each of said chambers, an intake passageway in the shaft of said internal rotor adapted to communicate with said ports and an exhaust passageway in the shaft of said internal rotor also adapted to communicate with said ports, a second intake passageway in the shaft of said internal rotor adapted to register with said ports and communicating with said first mentioned intake passageway to permit introduction of gaseous fluid into said chambers and adapted to start rotation of said rotors in counterclockwise direction, a third intake passageway adapted to register with said ports and communicating with said first mentioned intake passageway to permit introduction of gaseous fluid into said chambers and adapted to start rotation of said rotors in a clockwise direction, a slide valve mounted on the shaft of said internal rotor and adapted to slide thereon, ports in said slide valve adapted to register with said second mentioned intake passageway, other ports in said slide valve adapted to register with said third mentioned intake passageway, another port in said slide valve adapted to register with said first mentioned intake passageway and a plurality of exhaust ports in said slide valve adapted to register with the ports in said internal rotor.

6. In a gaseous fluid engine, an external rotor provided with a plurality of plane surfaces and mounted on a shaft, projecting rings in said external rotor provided with plane surfaces parallel to said first mentioned plane surfaces, an internal rotor mounted within said external rotor on a shaft integral with said first mentioned shaft and non-concentric therewith, a plurality of slots in said internal rotor, vanes in said slots and resting between said first and second mentioned plane surfaces, said vanes being adapted to divide the space between said rotor into a plurality of non-communicating chambers, a plurality of recesses in said internal rotor, a plurality of pins fixed to said external rotor and engaging said recesses, said recesses and pins being adapted to revolve said internal rotor synchronously with said external rotor, ports in said internal rotor communicating with each of said chambers, an intake passageway in the shaft of said internal rotor adapted to communicate with said ports and an exhaust passageway in the shaft of said internal rotor also adapted to communicate with said ports, a second intake passageway in the shaft of said internal rotor adapted to register with said ports and communicating with said first mentioned intake passageway to permit introduction of gaseous fluid into said chambers and adapted to start rotation of said rotors, a slide valve mounted on said shaft of said internal rotor and adapted to slide thereon, a port in said slide valve adapted to register with said second mentioned intake passageway, another port in said slide valve adapted to register with said first mentioned intake passageway and an exhaust port in said slide valve adapted to register with the ports in said internal rotor.

7. In a gaseous fluid engine, an external rotor mounted on a shaft, an internal rotor mounted within said external rotor and on a shaft eccentric with the shaft for said external rotor, a plurality of recesses in said internal rotor, pins in each of said recesses fixed to said external rotor, a plurality of radially disposed slots in said internal rotor, vanes in said slots movably engaged with said external rotor so as to divide the space between said rotors into a plurality of non-communicating chambers, radial ports in said rotor adapted to communicate with said chambers, an intake and an exhaust passageway in the shaft of said internal rotor adapted to communicate with said ports, a second intake passageway in the shaft of said internal rotor communicating with said first mentioned passageway adapted to permit introduction of gaseous fluid into said chambers to start rotation of said rotors, a slide valve mounted on said shaft of said internal rotor and adapted to slide thereon, a port in said slide valve adapted to register with said second mentioned intake passageway, another port in said slide valve adapted to register with said first mentioned intake passageway and an exhaust port in said slide valve adapted to register with the ports in said internal rotor.

ROBERT L. BAILEY.